Dec. 9, 1930. V. E. SHOWALTER 1,784,710
REAR VISION MIRROR
Filed Feb. 14, 1929
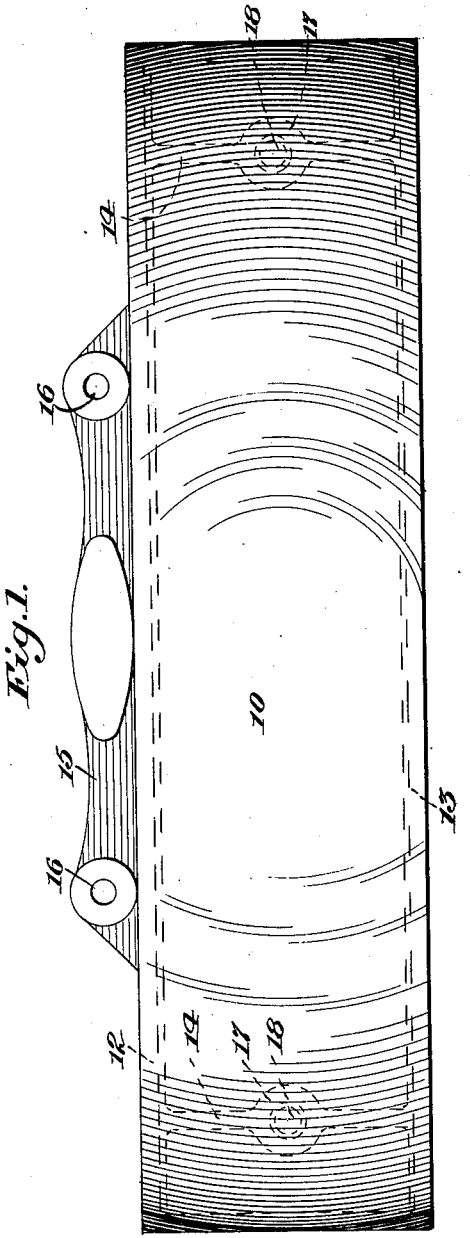
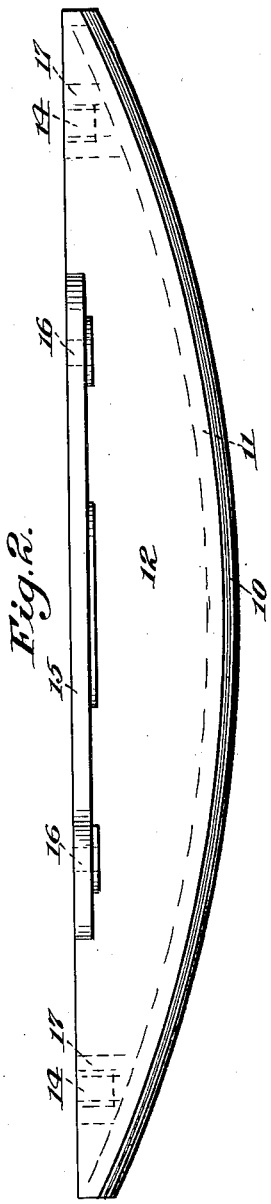
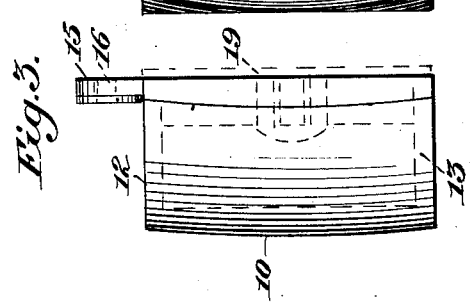
Inventor:
Victor E. Showalter,
by
Att'ys.

Patented Dec. 9, 1930

1,784,710

UNITED STATES PATENT OFFICE

VICTOR E. SHOWALTER, OF ELGIN, ILLINOIS, ASSIGNOR TO ELGIN NATIONAL WATCH COMPANY, OF CHICAGO, ILLINOIS, A CORPORATION OF ILLINOIS

REAR-VISION MIRROR

Application filed February 14, 1929. Serial No. 339,875.

This invention relates to improvements in rear vision mirrors, and more particularly concerns the construction of such a mirror of metal with a convex polished reflective surface.

One of the features of the present invention is the provision of a metal mirror which is made in a single piece embodying the polished mirror surface, means to stiffen and reinforce this surface, and means whereby the article may be attached to a support.

Another feature of the invention is the provision of an integral metallic article having stiffening and attaching means incorporated therewith.

An illustrative form of the invention is shown on the accompanying drawing, by way of example, in which:—

Fig. 1 is a front elevation of the mirror.
Fig. 2 is a top plan view of the mirror.
Fig. 3 is a side elevation.

In these drawings, the mirror is illustrated as having a reflecting surface 10, which is preferably a substantially rectangular or ovular portion of a sphere, that is, it has a greater angular dimension in one direction than in the direction at a right angle thereto. The illustrated form of the invention comprises an integral piece of metal having an arcuate front wall 11 substantially conforming to the surface 10, and upper and lower walls 12, 13 whose free edges extend chordally across the arc of this front wall 11 and stiffen and brace the same. Intermediate stiffening webs 14, which are preferably located adjacent the ends of the wall 11, may be provided between walls 12, 13 and employed to support the article during production. The upper wall 12 is provided with an upturned flange 15 having apertures 16 therethrough for the reception of means whereby the mirror may be fastened on a vehicle or the like. It is preferred also to form the stiffening webs 14 with posts 17 having threaded apertures 18 therein by which the mirror may be attached to a support; and by which a closing plate 19 may be fastened across the concave side of the article, if so desired, but it will be understood that the provision of such a closing plate is not essential.

The mirror may be constructed of sheet or cast material, and then the outer surface of the wall 11 is ground and/or burnished to form a segment of a spherical surface, and if a corrodible material is used for the body, it is preferred to coat this surface with a resistant metal such as chromium whereby its reflectivity is maintained. It will be understood that the surface may be made either totally or partially reflective to produce a more or less brilliant image as desired.

The metal mirror according to this invention has the advantage over the usual glass mirror in that its one-piece construction is capable of manufacture at a lesser cost and is not subject to a loosening or deterioration of the reflecting surface, and may be more firmly held in position so that it does not come out of adjustment due to vibration. Furthermore, the metal mirror is preferable over the silver back glass mirror in that there is no double image.

It is obvious that the invention may be practiced in other ways and for the making of other shapes of mirrors than that illustrated and described.

What I claim is:—

1. A metal rear vision mirror comprising an integral arcuate reflecting wall and chordal reinforcing walls, one of said chordal reinforcing walls having a projecting flange whereby the mirror may be attached to a support.

2. A device as in claim 1, in which the arcuate wall is formed as a portion of a sphere and provides a reflecting surface.

3. A rear vision mirror as in claim 1, in which intermediate webs connect the arcuate and closing walls whereby to stiffen and brace the same.

4. A device as in claim 1, in which the arcuate wall is formed as a portion of a sphere, and has a greater angular dimension in one direction than in the direction at a right angle thereto.

5. A metal rear vision mirror comprising a unitary structure providing a convex arcuate reflecting wall and chordal reenforcing walls, said arcuate wall having a greater width than height.

In testimony whereof, I affix my signature.
VICTOR E. SHOWALTER.